United States Patent Office 3,475,527
Patented Oct. 28, 1969

3,475,527
PROCESS FOR DESTROYING MELT CRYSTALLINE ORDER IN FIBER-FORMING POLYMERS
Richard D. Chapman, Durham, N.C., assignor to Monsanto Company, St. Louis, Mo., a corporation of Delaware
Filed Dec. 11, 1967, Ser. No. 689,707
Int. Cl. B29b 3/02, 5/04
U.S. Cl. 264—176                                          6 Claims

ABSTRACT OF THE DISCLOSURE

Nubless, high-luster yarns of crystallizable, synthetic polymers are produced at commercial spinning speeds by a process comprising effecting the destruction of the crystalline order in the polymer melts by filtration of the melt through microporous, fiber glass, non-woven mats prior to extrusion.

BACKGROUND OF THE INVENTION

Field of the invention

This invention relates to a melt extrusion process, and more particularly to a filtration process for the production of nubless, high-luster filaments from crystallizable, synthetic polymers.

Prior art

The melt spinning process, as it is applied to macromolecular fiber-forming polymers, is a field of technology that has been studied intensively for more than twenty years. Although this technology is well developed, exhaustive efforts are constantly sought to improve yarn uniformity and the efficiency of the fiber-producing process. In particular, it is quite common to find short, undrawn segments of yarn, known as "nubs," randomly distributed throughout the yarn. The presence of nubs in the yarn leads to poor dye depth, and dye uniformity in drawn yarn. It also causes poor drawtwist performance since the presence of nubs is one of the principal causes of breaks and wraps during the drawing process.

Nubs are composed of regions in the yarn where abnormally high crystallite sizes and concentrations exist and upon drawing do not yield at the same rate as normal nylon, thus resulting in either a break or in a segment of yarn having an abnormal degree of orientation. Either of these conditions is undesirable in nylon manufacturing processes. It is also quite common to produce yarns that have a uniform distribution of microscopic crystalline regions which results in slightly opaque appearance. The term "low luster" has been used to designate this condition and is undesirable because these yarns cannot be drawn at the maximum draw ratio and cause low productivity. Low-luster yarn and nubby yarn have their origin in polymer melts that have residual crystalline order.

The extent to which crystalline regions occur in polymers is a function of their molecular structure as well as their prior thermal history. This crystallinity can be destroyed conventionally by raising the temperature of the polymer melt well above its melting point and holding it at this temperature for a relatively long time. In this way a totally amorphous molten mass is obtained and will result in a product of uniform crystalline morphology as long as all other processing conditions are held constant. A serious limitation to this method is the polymer structure and reactivity in that rapid chemical changes occur at high temperatures. In considering polyamides, nylon 66 for example, the chemical changes that occur are principally decomposition whereby linear molecules are broken into shorter units which then react in such a way as to result in a highly cross-linked, higher-melting, insoluble material commonly referred to as "nylon gel."

Similarly, other crystallizable polymer systems, such as polyesters, polyesteramides, polyolefins, polycarbonates, polyvinyl halides, polyoxyalkylenes, polyureas, polyurethanes and the like, can undergo degradation that is characterized by a sharp decrease in average chain length through free radical formation, hydrolysis and the like, when subjected to high temperatures and dwell times. This is particularly undesirable in polyester and polyesteramide systems whereby sharp reductions in molecular weight are obtained through prolonged heating in the melt. In any case the elimination of crystalline order in the melt by thermal treatment is very disadvantageous because of the dangers of chemical degradation.

The crystalline order in polymer melts can also be destroyed by subjecting it to high shearing stresses. This can be done by forcing the viscous melts through relatively small orifices over long paths at a high volumetric flow rate. In conventional nylon melt spinning practice high shear stresses are accomplished by using a heavy sand pack as the filter medium and by employing a high pump rate. This practice is characterized by a very high pressure drop, which is the differences in pressure on the polymer before the pack and the pressure on the polymer as it emerges from the spinneret. Subjecting the melt to high shearing stresses by the above method is undesirable in commercial practice since it results in (1) frequent interruptions in the spinning process because of short pack life, and (2) higher equipment costs due to excessive pressure requirements. Therefore, the use of novel methods for destroying crystalline order in polymer melts is highly desirable, since it ultimately can lead to considerable economic advantage through the increased productivity made possible by the spinning of nubless yarn and subsequent drawing.

The filtration of molten resins during extrusion has been well described in the literature. Numerous filter-types have been used for various purposes. Well known examples of such filter media are (1) inert particulate matter, (2) metallic filings and turnings, (3) fritted glass, (4) sintered metals, (5) glass beads, (6) metal screens, (7) glass and resinous fiber fabrics and the like. In particular, U.S. Patent 2,904,828 describes the use of a woven glass fabric as a filter medium for nylon spinning to eliminate particulate impurities and develop high back pressures; U.S. Patent 3,295,161 describes the use of sintered stainless steel disks to homogenize resinous lumps under high pressures in plastics extrusion processses; U.S. Patent 2,792,122 utilizes a series of metallic plate filters to eliminate gas bubbles in melt spinning of synthetic linear polymers; and U.S. Patent 2,266,368 teaches the filtration of particulate material and the elimination of erratic pressure build-up by using several layers of finely divided sand with decreasing particle size in a predetermined order for melt spinning fiber-forming polymers. Heretofore, however, there has not been a filtration process which served to destroy the crystalline order of crystallizable, synthetic polymers effectively.

SUMMARY OF THE INVENTION

In accordance with the invention there is provided a process of producing high-luster, nubless yarn from fiber-forming crystallizable, synthetic polymers by the use of a glass fiber, non-woven filter medium alone or in combination with a conventional sand pack as part of a melt spinning process.

The subject matter of this invention is vastly different from anything known today, since the prior filtration art describes the separation and/or retention of physical heterogeneties such as lumps, gas bubbles, soil and the like. Instead, the use of fiber glass non-woven filter medium of this invention is not used for filtration in the conventional sense, but is responsible for the destruction of crystalline order in the melt, and makes it possible to produce high-luster, nubless yarn. In addition, this method has the advantage of being compatible with lower cost equipment having lower pressure requirements and can be used under relatively low pressures.

The synthetic polymers that may be used in the practice of this invention are those that are not only crystallizable but also fiber-forming by a melt spinning process and which exhibit melt crystalline order. These crystallizable polymers are referred to above. The production of nubless yarn by the process of this invention has many advantages. In particular it reduces polymer degradation in the melt pool since the melt temperature and molten polymer dwell time can be reduced while permitting an efficient spinning process. This invention is also highly advantageous in the field of conjugate spinning of two or more different polymers. Often there may be a large difference in the melting points of these polymers, and with the filter medium of this invention one can virtually eliminate degradation of the lower melting polymer by being able to spin both polymers at a temperature only slightly above the melting point of the higher melting polymer. Another advantage of this process is that large pressure drops are not encountered in the use of fiber glass filters and hence will permit the use of equipment with lower pressure tolerances and allow lower equipment in costs. Still another important advantage of this invention is that it permits the production of nubless yarn and a corresponding increase in overall fiber forming efficiency from the pronounced reduction in breaks and wraps during the drawtwist operation.

The filter medium of this invention comprises a fiber glass, non-woven pad made of micron-size glass filaments and is characterized by being microporous and totally inert to polymer systems. The filters can be made on conventional paper making machinery from flock about 5 mm. long and 12 microns in diameter and binder about 0.3 mm. long and 1 to 2 microns in diameter. The non-woven fiber glass filters have a pore size of less than about 0.1 micron and preferably, less than 0.05 micron. The efficiency of these filters is greater than 98 percent for particles as small as 0.5 micron. Filter thickness is usually about 0.5 mm. for convenience in handling, but may be altered to suit a particular system. The effect of using these fiber glass mats in destroying melt crystalline order is unexpected, in fact, the discovery that such filters could accomplish this destruction was quite surprising. Although, these filters were known to be effective to filter particulate matter, the additional property of being able to destroy crystalline order was unrecognized.

The fiber glass filters of the type described above are used as an integral part of the spinning process for the purpose of destroying the melt crystalline order of the polymer. In the past this was accomplished by heating the polymer at a high temperature for a long time or by subjecting the polymer to high shear stresses. Both methods are characterized by relatively high energy input and it is believed to be responsible for the conventional destruction of melt order. In sharp contrast to known art, the process of this invention does not require similarly high energy input, but in fact permits the use of lower shearing stresses and lower temperatures. In this respect, the production of high luster, nubless yarn by filtration through micro-porous fiber glass filters was totally unsuspected and the mechanism by which the destruction occurs is not fully understood. However, this lack of knowledge is not intended to detract from novelty or practice of this invention.

Figure 1:
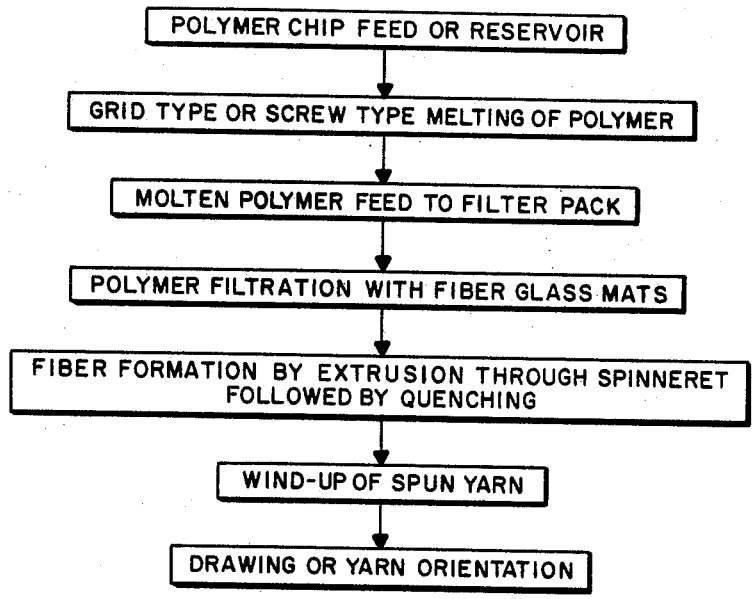
FIGURE 1 is an illustrated flow-sheet embodiment of a typical melt spinning process, for fiber-forming polymers, with the filter medium of this invention.

In convention melt spinning processes, as illustrated in FIG. 1, fiber-forming polymer chips are held in a reservoir, then fed to a suitable means of melting the polymer, such as a melt grid or a screw extruder. Grids temperatures are kept well above the polymer's melting point as is recognized in the art as necessary to allow the melt to fall or flow to a melt pool. Screw extruders have a temperature gradient along the barrel such that the highest temperature is at or near the discharge point. Again, the exit temperature is kept far enough above the polymer's melting point to obtain desired flow characteristics. Ordinarily, regardless of the method of polymer liquification, a suitable metering system is used to control the volumetric flow rate of the melt and force it through a filter pack containing at least one layer of a non-woven fiber glass mat. The metered melt then passes through the capillaries of the spinneret to form viscous filaments of the desired number and size after which the filaments are quenched and solidified. The filaments are next wound on a suitable bobbin and subsequently may be drawn or oriented to enhance certain physical properties.

Figure 2:
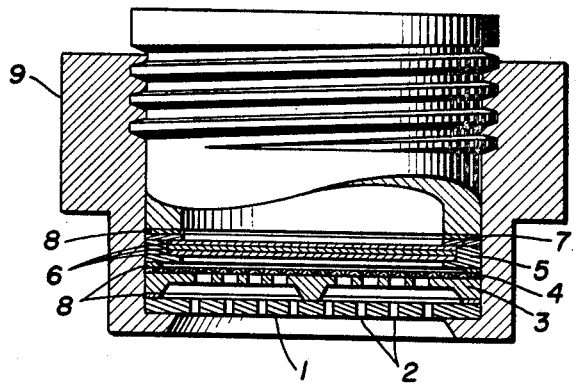

FIGURE 2 is a cross-sectional view of the combination filter-spinneret assembly of this invention. Referring to FIGURE 2 the spinneret assembly consists of a spinneret 1 having a plurality of capillaries 2, or orifices, in the spinneret face. Above the spinneret is a polymer distribution plate 3 over which there are metallic screens 4 of the appropriate mesh. One or more metallic screens may be used, as needed, preferably of stainless steel having various mesh sizes. Above the screens is mounted the filter holder 5 which retains one or more fiber glass, non-woven filters 6. The filters are confined in the filter holder by means of a flat aluminum cover 7. The essential elements of the spinneret are sealed at the periphery by means of soft metal gaskets 8, and are contained within the spinneret pack holder 9.

DESCRIPTION OF THE PREFERRED
EMBODIMENTS

The following detailed examples are submitted to further illustrate the process of the invention with reference to certain fiber-forming polymers. It is to be understood that this invention is not to be limited to the specific details of the examples.

Example I

This example illustrates a process of producing nubless yarn from nylon 66 polymer chips. A sample of crystalline nylon 66 polymer chips was spun on a laboratory melt spinning machine under the usual conditions with a double preheater grid. Grid temperatures were 286–287° C., jacket temperature was 297° C. Polymer throughput rate was 32.4 g./min. through a 35 hole (9 x 12 mil) spinneret and taken up at 300 yards per minute. The spinneret pack was made up with five layers of fiber glass non-woven filter medium about 0.5 mm. thick having a pore size of less than about 0.05 micron supported on a 40–325–40 mesh screen sandwich and covered with 10 cc. "A" sand. Process conditions were consistent with those desired for maximum productivity, exhibited low thermal degradation and relatively low pack pressures. The resulting spun yarn had high luster and was nubless, indicating the destruction of melt crystalline order by filtration with glass non-woven filters. This yarn could be cold drawn on a drawtwister with very high efficiency. The resulting fibers are quite valuable as textile fibers, reinforcement fibers and industrial fibers.

Examples II–VI

This example shows a use of the filter to make low temperature spinning possible. In these examples, nylon 6 was spun according to the procedure set forth in Example I except that the temperature was 230° C. However, trouble with nubby yarn resulted unless high shear packs were used, and these packs gave low pump rates due to high pressure drops. The glass fiber filter gave good filtration and good rates. Results were noted as follows:

| | Sand Type and Thickness | | | Glass fiber filter | Pump rate, g./rev. | Nubs |
|---|---|---|---|---|---|---|
| | 100-150 mesh | 60-80 mesh | "A" | | | |
| Examples: | | | | | | |
| II | None | None | 3 cc | None | 0.54 | Yes. |
| III | do | 1 cc | 2 cc | do | 0.55 | Yes. |
| IV | ½ cc | ½ cc | 2 cc | do | 0.07 | No. |
| V | None | None | 3 cc | 1 layer | 0.53 | No. |
| VI | No pack | | | | 0.56 | Yes. |

These examples were carried out on a laboratory spinning machine with commercially available nylon 6 flake, grid at 290° C., pack at 230° C. Under these conditions, only when the glass fiber filter was used could yarn be spun without nubs, unless a high shear pack was used, shown in Example IV. With this high shear sand pack, abnormally low throughput rates were observed which obviously resulted in inefficient spinning.

It will be understood that various changes in details, materials, steps and arrangements of parts, which have been described above and illustrated to explain the nature of the invention may be made by those skilled in the art within the principle and scope of the invention as expressed in the appended claims.

I claim:
1. A process for producing nubless, high-luster filaments from fiber-forming crystallizable, synthetic polymers which comprises melting the polymer, passing the molten polymer through at least one inert, microporous, non-woven, fiber glass mat and thereafter extruding the polymer into filaments.
2. The process of claim 1 wherein the synthetic polymer is a polyamide.
3. The process of claim 1 wherein the fiber glass mat has a pore size of less than 0.1 micron.
4. The process of claim 1 wherein the fiber glass mat has a pore size of less than 0.05 micron.
5. The process of claim 1 wherein the synthetic polymer is nylon 66.
6. The process of claim 1 wherein the synthetic polymer is nylon 6.

References Cited

UNITED STATES PATENTS 2,904,828  9/1959  Smith.

JULIUS FROME, Primary Examiner

J. H. WOO, Assistant Examiner

U.S. Cl. X.R.

18—8